United States Patent [19]
Lin

[11] Patent Number: 6,032,200
[45] Date of Patent: Feb. 29, 2000

[54] PROCESS SCHEDULING FOR STREAMING DATA THROUGH SCHEDULING OF DISK JOBS AND NETWORK JOBS AND THE RELATIONSHIP OF THE SCHEDULING BETWEEN THESE TYPES OF JOBS

[75] Inventor: Mengjou Lin, San Jose, Calif.

[73] Assignee: Apple Computer, Inc., Cupertino, Calif.

[21] Appl. No.: 08/724,118

[22] Filed: Sep. 30, 1996

[51] Int. Cl.[7] ...................................................... G06F 7/22
[52] U.S. Cl. .................................. 710/6; 710/21; 710/61
[58] Field of Search .................... 384/7; 380/5; 711/118; 710/6, 21, 61

[56] References Cited

U.S. PATENT DOCUMENTS

| | | | |
|---|---|---|---|
| 5,583,561 | 12/1996 | Baker et al. ................................. | 384/7 |
| 5,606,359 | 2/1997 | Youden et al. ............................... | 348/7 |
| 5,734,719 | 3/1998 | Tsevdos et al. .............................. | 380/5 |
| 5,737,747 | 4/1998 | Vishlitzky et al. ....................... | 711/118 |
| 5,754,882 | 5/1998 | Tobagi et al. ................................ | 710/6 |

*Primary Examiner*—Albert De Cady
*Assistant Examiner*—David Ton
*Attorney, Agent, or Firm*—Edward W. Scott, IV

[57] ABSTRACT

Processing streaming data on demand in a computer system. A service cycle is divided into a first plurality of input/output (I/O) phases for a second plurality of streams of real-time data. For each of the first plurality of I/O phases, a disk job, if any, is scheduled for one of the second plurality of streams of real-time data, and a second plurality of network jobs, each of the disk jobs corresponding with each of the second plurality of streams of real-time data.

27 Claims, 11 Drawing Sheets

PROCESS SCHEDULING FOR STREAMING DATA THROUGH SCHEDULING OF DISK JOBS AND NETWORK JOBS AND THE RELATIONSHIP OF THE SCHEDULING BETWEEN THESE TYPES OF JOBS

CROSS-REFERENCE TO RELATED APPLICATIONS

This application is related to an application entitled "Admission Control for Real-time Data Streams" by Meng-jou Lin filed concurrently herewith which has been assigned application Ser. No. 08/723,403, now abandoned.

BACKGROUND OF THE INVENTION

1. Field of the Invention

The present invention relates to the real-time streaming of data between endpoints. Such data may include video on-demand, audio, or any other type of streaming data which should be transmitted in real-time.

2. Background

Client/server communication typically follows a transaction model. A server remains idle until it has received a request from a client. A client request for N bytes of data can then be made which is received by the server. The server serves the request and returns the N bytes of data to the client. The client processes the data, and when complete, requests another N bytes of data, to which the server receives and responds, and the client processes. For a continuous stream of data, e.g. audio and/or video data, the process continues until the client has requested the entire stream from the server. An example of this prior art protocol is illustrated in FIG. 1.

This prior art protocol is adequate for many applications, however, for an audio or video on-demand application, performance greatly suffers. Because each chunk of data requires a whole transaction in order for it to be transmitted, the scheme suffers from long propagation delays in the transmission of the request and the corresponding response of data. This is exacerbated in wide area networks (WAN's) or wireless networks which adds additional propagation delays to the stream.

Disk inefficiency also introduces latency into the processes performed in prior systems. Disk latency consists of three components: disk seek, rotational latency and data transfer time. The latency to retrieve a small block (e.g. less than 32 KBytes) of disk data is usually dominated by disk seek and rotational latency. For example, the average seek time and rotational latency of a disk drive is about 9, and 4 milli seconds, respectively. However, the time to transfer a 32 KBytes of data is about 6.4 milliseconds. The data transfer time occupies only 33% (6.4/19.4) of total time (11% for 8 KBytes of data retrieval assuming that the I/O bus can sustain 5 MBytes/sec transfer rates, such as a SCSI-1 bus). More efficient disk access mechanisms for such schemes are required.

Network congestion also causes prior art schemes such as these to suffer from inefficiencies. Due to the effects of disk latency, it may be advantageous to retrieve data in larger blocks. However, the delivery of those larger blocks increases the chance of packet loss because of the random behavior of client requests. A traffic smoothing function may be required to reduce the possibility of packet loss.

It is therefore desirable to minimize such shortcomings for improved performance of real-time streaming applications, such as video on-demand services.

SUMMARY

A method and apparatus for processing streaming data on demand in a computer system. The method includes dividing a service cycle into a first plurality of input/output (I/O) phases for a second plurality of streams of real-time data. For each of the first plurality of I/O phases, scheduling a disk job, if any, for one of the second plurality of streams of real-time data, and a second plurality of network jobs, each of the disk jobs corresponding with each of the second plurality of streams of real-time data.

Each the I/O phase may also include a control job, if any, for negotiating a control request from a client for a stream of the real-time data, such as the a request to admit a new stream of real-time data.

In implemented embodiments, the second plurality of network jobs obtain data from a disk job from one of the first plurality of I/O phases.

In implemented embodiments, each disk job i has a length $M_i$ and each network job has a length $N_i$ and the first plurality is equal to $M_i/N_i$. In this embodiment, the second plurality has a maximum value equal to the first plurality. The disk job, if any, is scheduled for a current I/O phase if no disk job has been scheduled for all of the streams of real-time data for the current service cycle.

In alternative embodiments, the disk job and the second plurality of network jobs may be executed concurrently, such as in a multi-tasking or multi-processing environment. For additional performance enhancement, the scheduling of the disk job for each of the first plurality of I/O phases is further qualified by a physical location of each of the second plurality of streams of real-time data.

In one embodiment, the computer system includes a server, such as a audio/video on-demand server and the scheduling of the disk job, if any, and the second plurality of network jobs is responsive to a client request for each of the second plurality of streams of real-time data.

BRIEF DESCRIPTION OF THE DRAWINGS

The present invention is illustrated by way of examples and is not limited by the figures of the accompanying in which like references indicate similar elements and in which.

DETAILED DESCRIPTION

The present invention relates to providing real-time data using a streaming mechanism. This decoding may take place in a variety of environments, including, programmed computer systems or devices, or dedicated devices for such decoding. Although the present invention will be described with reference to certain specific embodiments thereof, especially, with relation to certain hardware configurations, method steps, and other specific details, these should not be viewed as limiting the present invention. Various modifications and other changes may be made by one skilled in the art, without departing from the overall spirit and scope of the present invention.

Figure 2:
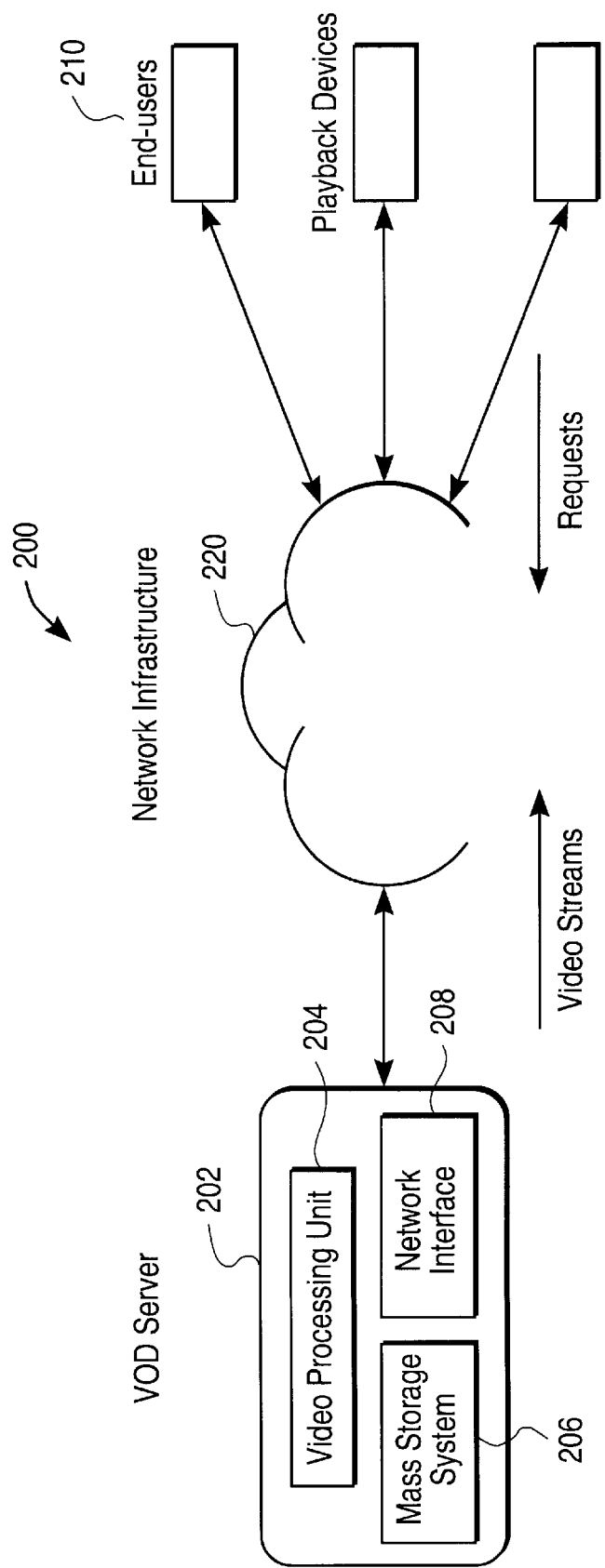
FIG. 2 shows a conceptual video on-demand (VOD) architecture.

A system which provides streaming data, such as a video on-demand system, is shown in FIG. 2. The system includes a video on-demand VOD) server 202 which communicates with a number of end-user playback devices 210 over a network infrastructure 220. The VOD server 202 may be any of a number of personal computers available, such as the Macintosh 9500 series of personal computers available from Apple Computer, Inc., of Cupertino, Calif. The VOD server 202 includes a video processing unit 204 which handles the VOD serer's functions, mass storage device(s) 206, such as disk and/or tape drive(s), and a network interface 208 for communicating with the network infrastructure 220. The network infrastructure 220 may include any of a number of known networking media employing different protocols, for example, asynchronous transfer mode (ATM). End user devices 210 may be dedicated devices or general purpose computers for decoding the streams provided by VOD server 202. The streams may be encoded in any of a number of manners, including the motion pictures experts group (MPEG) format. Playback devices 210 issue requests for streams to VOD server 202 and server 202 may issue response(s) to such requests and streaming data, such as video and/or audio.

Figure 3:
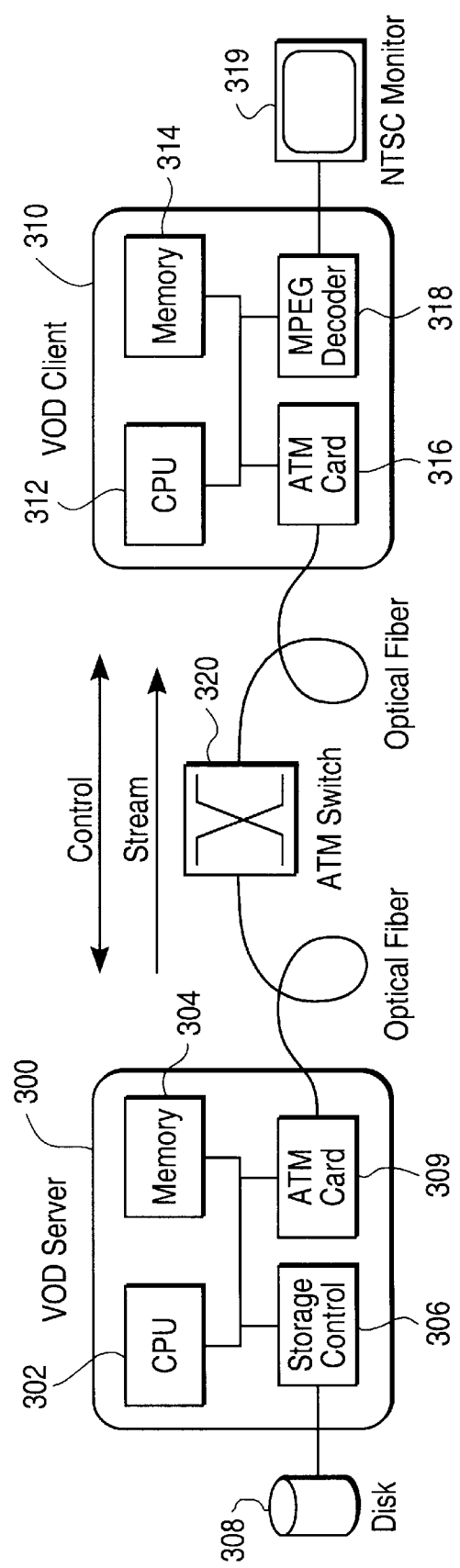
FIG. 3 shows a specific configuration of a VOD client and server.

In an example embodiment, the VOD system may be configured as shown in FIG. 3. A VOD server 300 may include a central processor (or processors, in a multiprocessing server) 302 for executing instructions and a memory 304 for transient storage of data and instructions processed by central processor 302. The server 300 may include a storage control mechanism 306, such as disk interface adapter/controller(s), and a corresponding disk drive(s) coupled to the controller(s) for long-term storage of instructions (such as the as the scheduling process discussed herein) and data such as streaming data (e.g. audio and/or video). The server also includes network adapter(s) 309, such as an ATM card. The server may be coupled to a ATM switch 320 via any type of media (e.g. fiber optic) for communication with a VOD client 310. Client 310 is similarly configured as server 300 (it has CPU 312, Memory 314, and ATM adapter 314), however, it also has a decoder, such as an MPEG decoder for decoding the stream data and presentation upon a display 319, such as an NTSC or computer system display, for presentation to a user. Of course, the MPEG decoder need not be dedicated hardware or software, but instead, may be a process which resides in memory 314 of client 310 which is loaded from an internal memory, or long-term storage.

Figure 4:
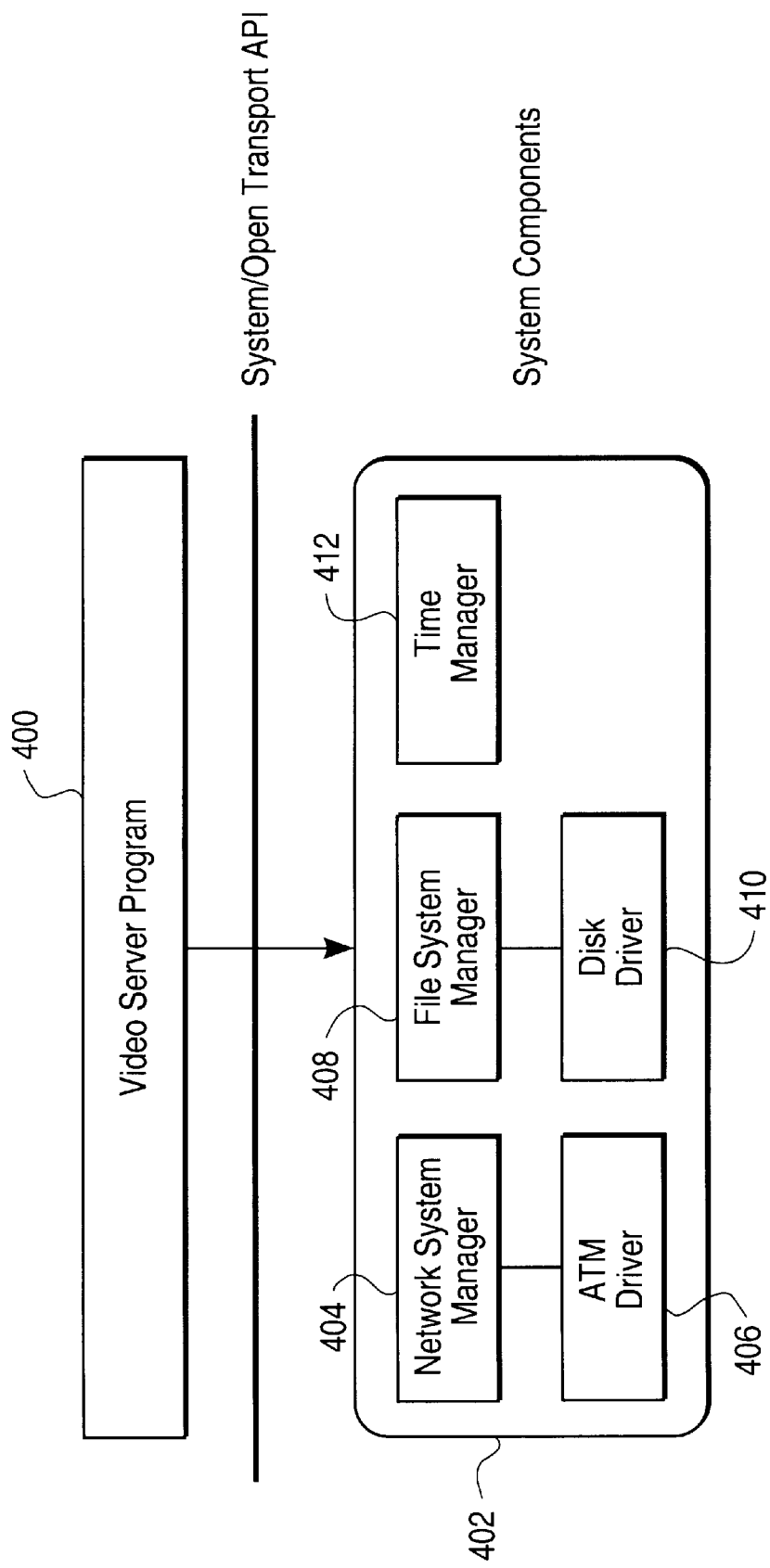
FIG. 4 shows the software configuration of a VOD server.

FIG. 4 shows an example software architecture of a VOD server. The figure illustrates a plurality of processes which may be resident in the server's system memory 304 for providing the scheduling and protocol functions to be described here. A video server program 400 may provide all the necessary protocol exchanges and scheduling functions which are required. The program communicates with a plurality of processes which are operative within the underlying system's operating system 402. For networking functions, the program communicates with a network system manager 404 which in turn communicates with a network driver 406. For file system functions, a file system manager 408 is communicated with, for example, for accessing requested streams. The file system manager communicates with a disk driver 410 which is in communicated with an underlying device, such as a disk drive, on which the streams are stored. To ensure timely delivery of the streams, a time manager process 412 is used to set up tasks that must be executed periodically, schedule streams, and coordinate and synchronize actions in the system.

Client/Server Streaming Protocol

Figure 1:
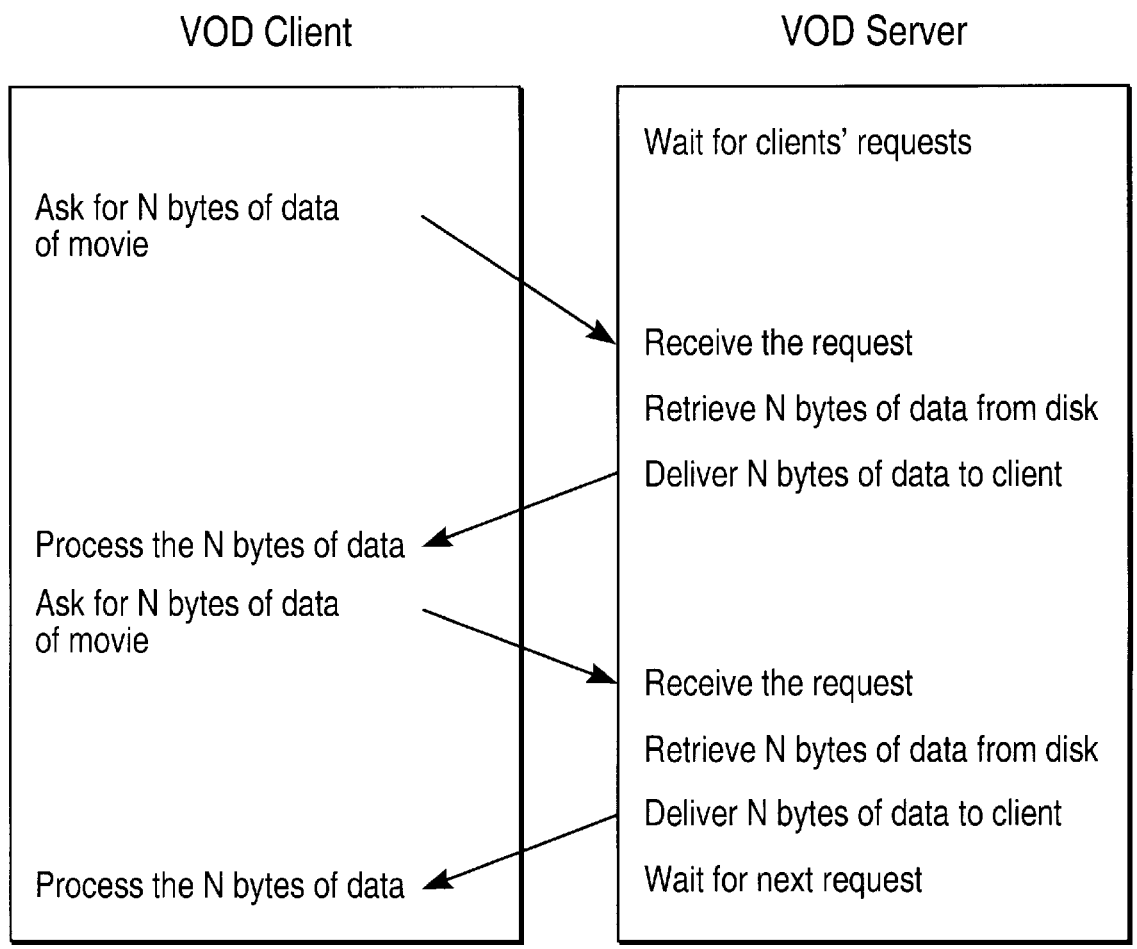
FIG. 1 shows a prior art client/server transaction.
Figure 5:
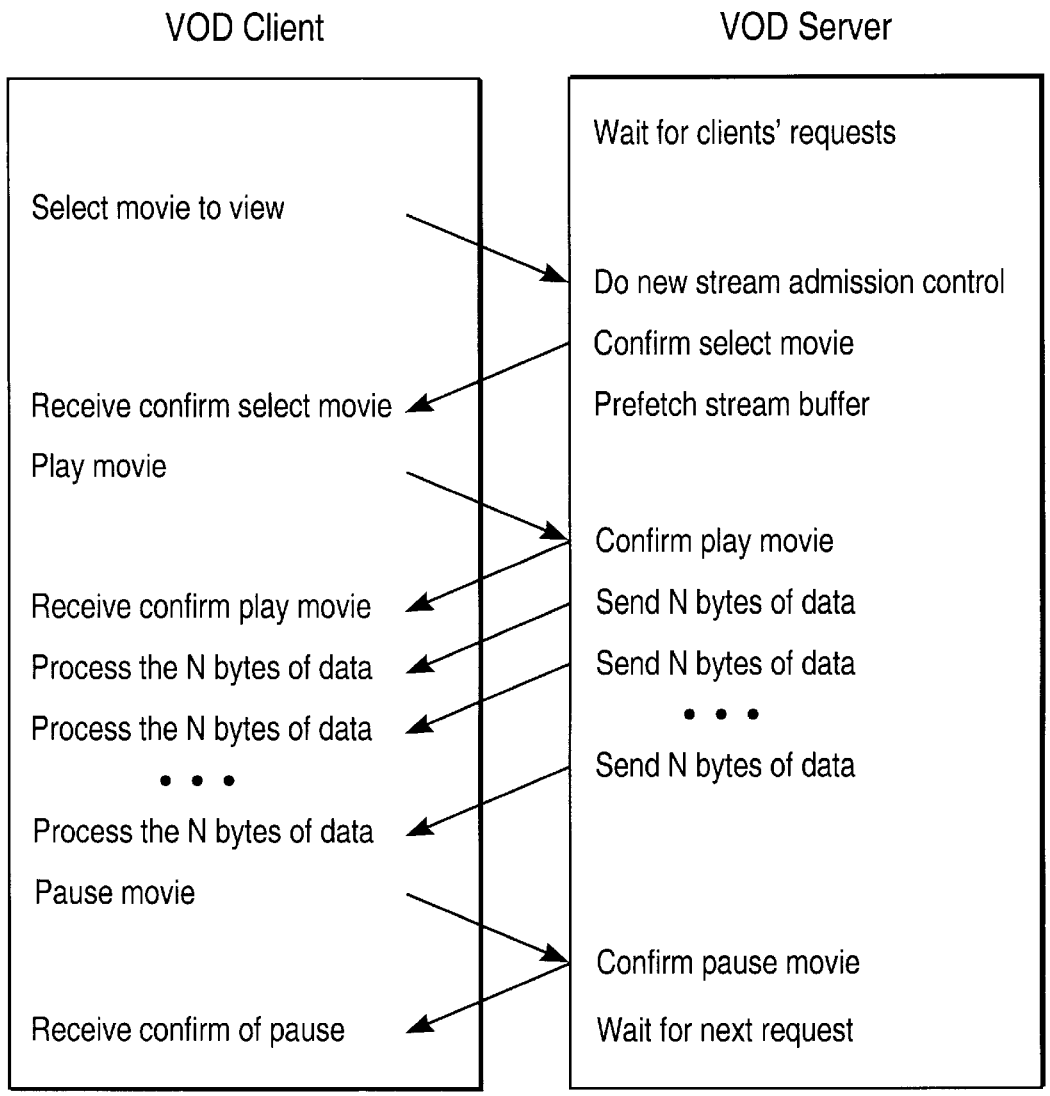
FIG. 5 shows a protocol between a client and a server for providing streaming data, such as video on-demand.

FIG. 5 illustrates the protocol between a client and a server for providing streaming data in real-time. Instead of a request/response protocol, as in the prior art protocol illustrated in FIG. 1, the protocol in the implemented embodiments of the present invention uses an initial request/response between the client and the server, and then data is provided from the server to the client without acknowledgment. There is no additional interaction required between the client and server. This reduced interaction between the client and the server conserves communication bandwidth between the server and the client, and thus, improves overall streaming performance.

As illustrated in FIG. 5, the VOD server remains idle or is otherwise handling other clients'request while awaiting for new requests from a client. A VOD client initiates communication by making a request, such as one to view a movie, to the server. The server performs any necessary stream admission control and confirms the selection of the movie to the client. The server then prefetches the stream to load buffers for provision of the stream to the client.

The client receives the confirmation of the selection of the movie from the server. Then, the client sends a request to the server to play the movie. The server receives the request, and generates a corresponding confirmation to play the movie which is sent to the client which is then received by the client. The server then starts sending data in chunks of N bytes to the client. The client receives the N bytes of data as last as the server can provide it (as the medium and the content permits). No further interaction between the client and the server take place as long as long as the client desires to continue to receive the data and there is data available. The last request from the client is operative as long as the data is available or an error in delivery is incurred and no change in mode is requested.

For example, at some time during the playback of the movie, the client might request that the stream be paused. Such a request is sent to the server, and the server performs the request (pauses playback), and awaits further requests from the client. Confirmation is generated and sent to the client to indicate performance of the request.

Real Time Stream Scheduling

Figure 6:
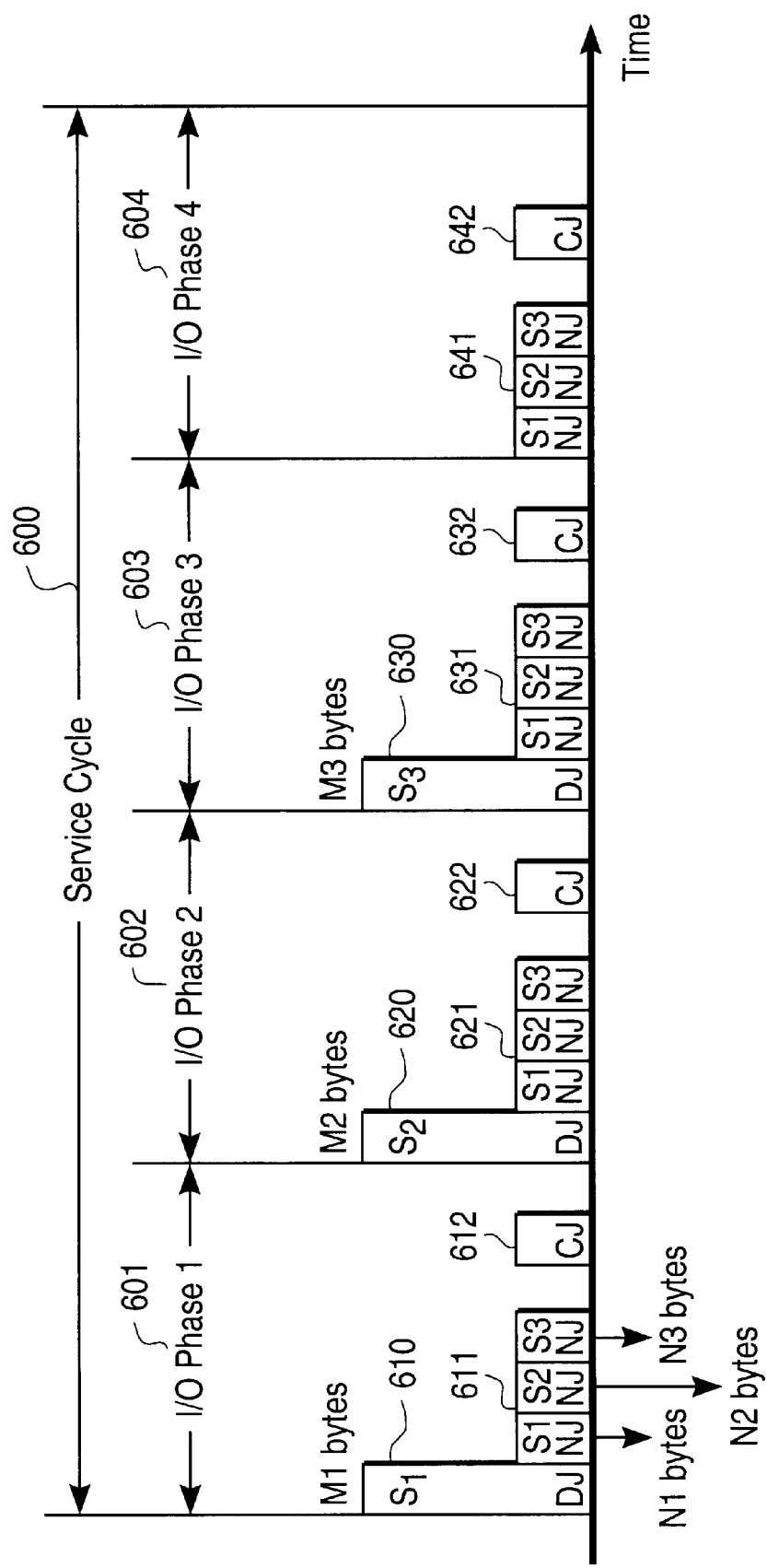
FIG. 6 shows how disk, network and control operations are scheduled in a server to provide streaming data to client(s).

FIG. 6 shows the scheduling of the various jobs required for providing streaming data on demand in real-time in an implementation of the present invention.

Real-time scheduling for a VOD server, in embodiments of the present invention, is illustrated in FIG. 6. The scheduling could be performed by a single integrated process, such as a dedicated VOD server in a dedicated device or an application in a general purpose computer which communicates with an underlying operating system to provide the communication services (e.g. TCP/IP, Appletalk, etc. . .) for the underlying medium (Ethernet, FDDI, ATM, switched Ethernet, etc. . . . ).

In embodiments of the present invention, there are a maximum of C streams (S1, S2, . . . Sc) which may be accepted by the admission control scheme. That is, there are a maximum of C active clients which the server can provide streaming data to.

The VOD server retrieves $M_i$ bytes of data from disk for $S_i$ known as a disk job. The $M_i$ bytes of data (audio, video, or raw data) could be stored on single disk drive or striped across multiple disk drives. The VOD server sends $N_i$ bytes of data known as a network job for $S_i$ to destination via network interfaces (ATM, switched ethernet, or FDDI). Data for network jobs are obtained from disk job data.

A control job is a control request that the VOD server processes from remote clients. Control messages include join, leave the server via admission control mechanism (described later), and VCR control functions (play, pause, fast forward, fast backward, and random seek) for active clients.

The VOD server partitions the available system time into consecutive time frames known as I/O phases. Each I/O phase has a fixed duration, for example T, to process the previous three types of jobs (DJ, NJ, and CJ). Those three types of jobs are processed accordingly. A service cycle consists of C number of I/O phases. C is a constant derived from Mi/Ni for Si. In embodiments of the present invention, the rate of delivery $R_i$ for each stream to each client is Ni/T for Si.

FIG. 6 shows an example of 3 active streams in a service cycle 600 with 4 I/O phases (C=4) in an embodiment of the present invention. In phase 1 601, the system schedules one DJ 610 (M1 bytes of data) for stream S1 and 3 NJ's 611 (Ni=Mi/4 bytes of data, i=1, 2, or 3) or S1, S2, and S3. Then, a control job (CJ) 612 is scheduled, if any time remains in the I/O phase 601. In phase 2 602, the system enables the DJ 620 (M2 bytes of data) for stream S2 and 3 NJs 621. A control job 622, if any, can then be performed in the remaining time of phase 2, 602. In phase 3, a DJ 630 for S3 is enabled. Then, the NJ's 631 are performed for S1, S2, and S3. A control job 632 may also be performed in I/O phase 603. I/O phase 4 contains only the 3 NJs for S1, S2 and S3, since there is no fourth stream being provided from the server to any client. Therefore, no disk jobs are performed in the fourth I/O phase 604 of service cycle 600. A control job 642 can also be perfumed. A new service cycle is then performed subsequently to 600, which schedules processing in the same way.

The remaining time of each I/O phase is used to process control requests issued by remote clients. In this example, the VOD server is able to handle up to a maximum of 4 concurrent streams. That is, one additional stream could be accepted by the VOD server because it could be scheduled to occupy the fourth I/O phase 604 for its DJ and its NJ in each of the other I/O phases 601–603.

Figure 7A:
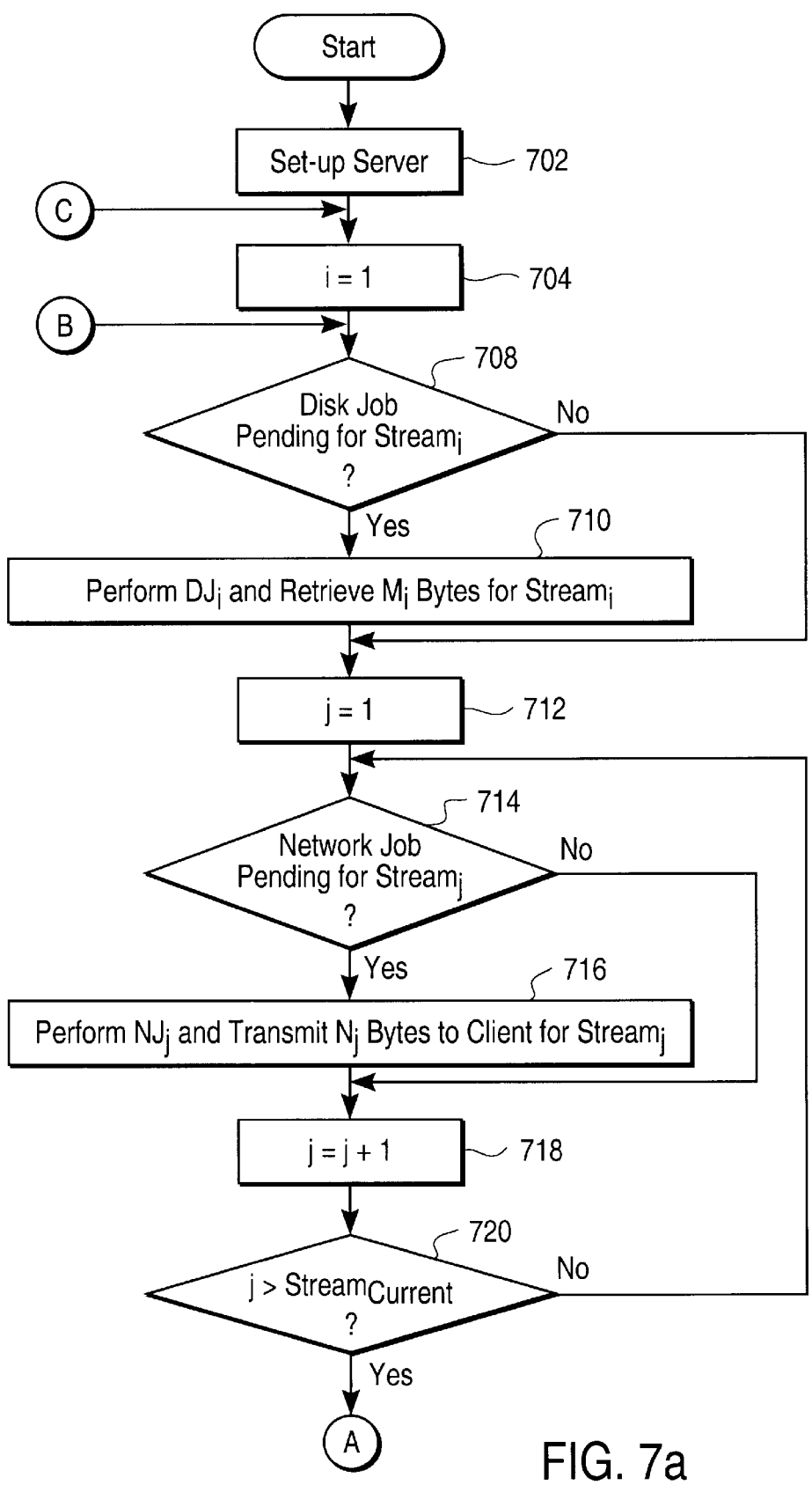
FIGS. 7a–7b shows a method of job scheduling in a server.
Figure 7B:
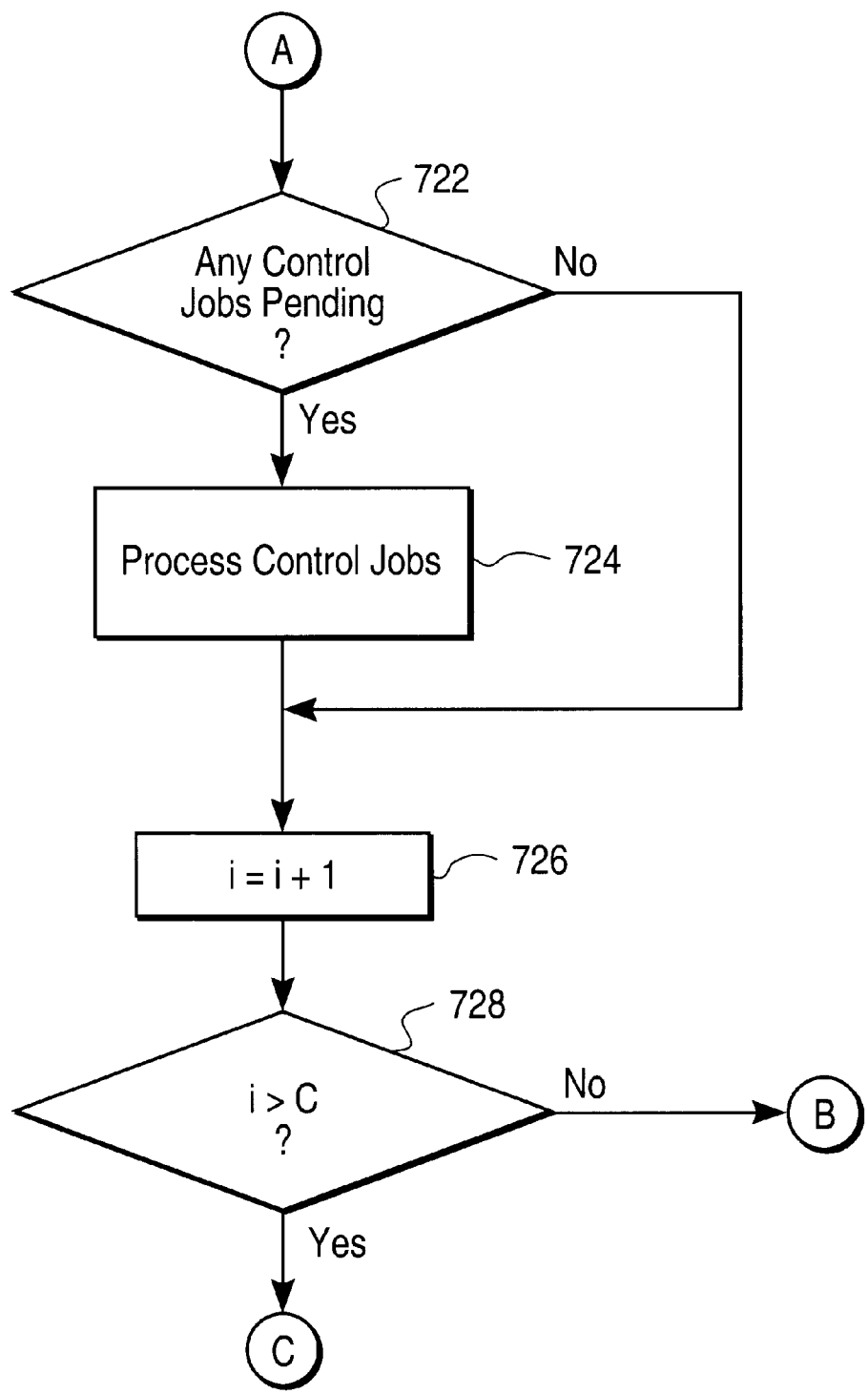

A method for scheduling jobs for stream is shown in FIGS. 7a–7b. Although a sequential method is shown in the figures, DJ and NJ processing could take place within their respective I/O phase concurrently in a multi-processing or multi-tasking environment. Thus, this modification to the illustrated steps are within the scope of this disclosure. At step 702, the server is set-up. Various parameters for the server can be pre-established or retrieved, such as $N_i$ and $M_j$, and C. An index i can be initialized at step 704 in order to track the I/O phase in the service cycle. At the beginning of each I/O phase, it is determined whether there are any disk jobs pending for the current I/O phase i at step 708. If there is not a disk job $DJ_i$ for the current I/O phase, then the process proceeds to process the network jobs NJ. If there is a current disk job $DJ_i$, then it is processed at step 710, retrieving $M_i$ bytes for stream $S_i$ so that the data may be available for the corresponding network jobs for the stream.

After the processing of the disk job $DJ_i$ for the current I/O phase i, the process continues at step 712 wherein a second index j is initialized. At step 714, it is determined whether there are any pending network jobs $NJ_j$ for stream j. If so, then the network job $NJ_j$ is performed at step 716, and the $N_i$ bytes of data are transmitted from the server to the client for stream $S_j$. After the processing of the network job, if any, the index j is incremented at step 718. At step 720, it is determined whether all of the network jobs for the current streams have been processed, that is, that the index j has exceeded a value representing the current number of streams. If not, then the process continues at step 714, and the network job processing continues. If so, then the process continues on FIG. 7b.

At step 722 on FIG. 7b, the control job processing is shown. If there are any control jobs pending, then step 724 is performed wherein any control jobs, time permitting, are performed. For example, such control jobs may include messages requesting admission of a new stream, requesting a pause/play/backward play, etc. . . . of a stream can be processed. Subsequent to the processing of control jobs, if any, in the I/O phase, index i is incremented. At step 728, it is determined whether index i has exceeded C, the maximum number of streams (or the number of I/O phases in the service cycle). If so, then a new service cycle is commenced by returning to step 704. If not, then the processing for the next I/O phase commences at step 708.

As can be seen by the foregoing, scheduling of jobs for processing real-time data, such as streams in an on-demand environment, is simplified, and is scalable according to the capacity of the server and the media upon which the data may be transmitted.

Figure 8:
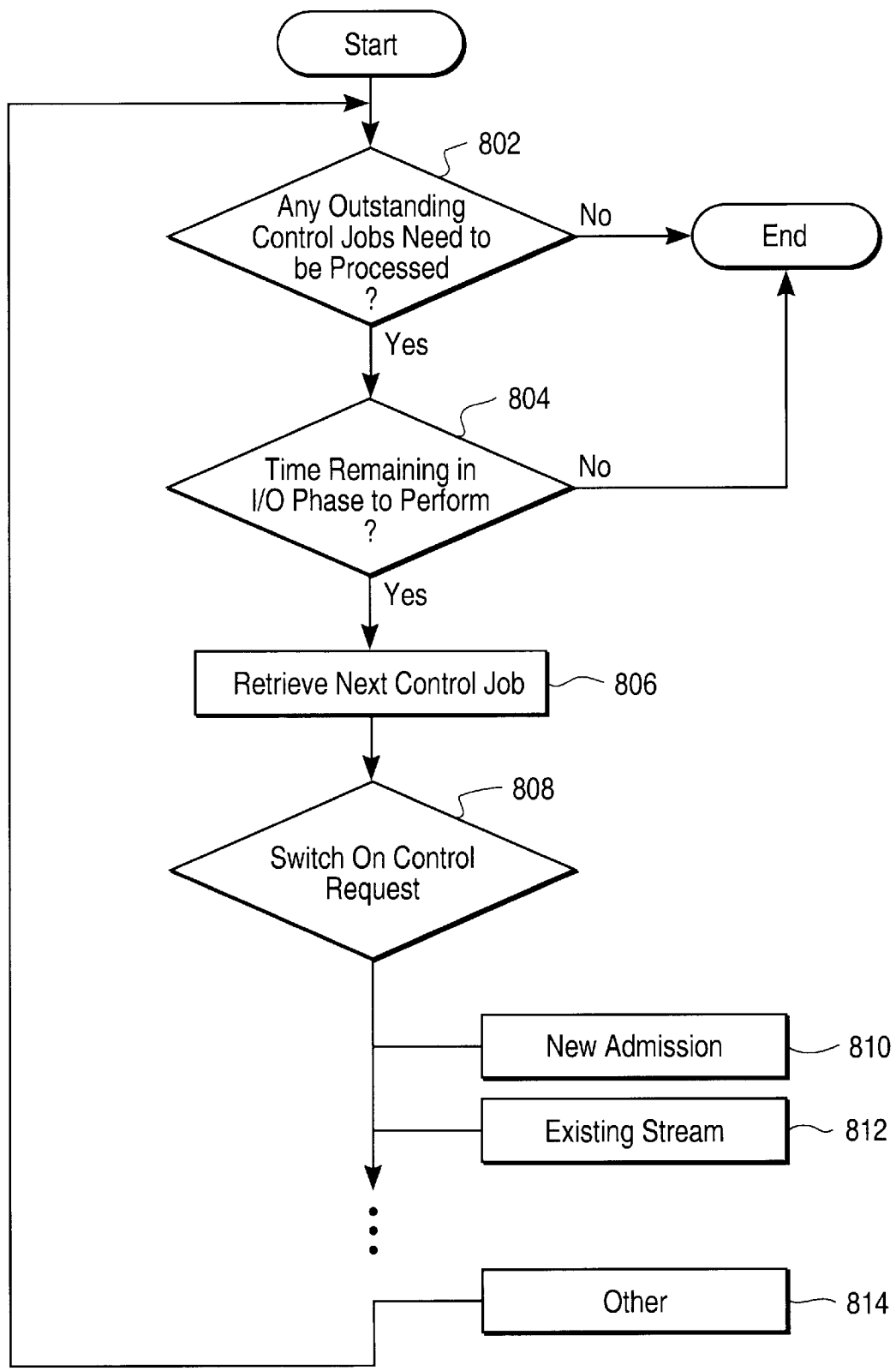
FIG. 8 shows a method for processing control jobs in a server.

FIG. 8 shows a method for processing control jobs, such as in the final portion of each I/O phase, such as step 724 of FIG. 7b. For example, at step 802, it is determined whether there are any outstanding control jobs to be processed. If not, the process is complete. If there are control jobs to be processed, then it may be determined at step 804 whether there is time remaining in the I/O phase to process it. If not, then the process ends. If so, then the control job can be performed.

At step 806, the next control job is retrieved. In one implementation, control jobs can be ordered for processing in a queue in a first in first out (FIFO) manner, in another, control jobs can be processed by means of a more sophisticated protocol, such as a priority scheme. Once the control job is received, the type of control job is checked for, by means of a switch control statement, or other means, such as at step 808. A plurality of different processes for different control jobs can then be executed, such as a new stream admission control job at step 810, a control job for an existing stream (e.g. play, pause, reverse play, etc. . . . ) at step 812, or any other control job at step 814. Control jobs can be continued to be processed as long as there are any queued, as detected at step 802, and there is time remaining in the I/O phase as detected at step 804.

Examples of scheduling with various capacity media and systems is shown as follows:

Example Case 1

Assume, the VOD server has SCSI-1 storage with a transfer rate of 5 MBytes/sec.

Mi=128 KBytes, for all i

Ni=8 Kbytes, for all i

C=Mi/Ni=16,

If we assume the system platform could only perform sequential I/O. i.e. there is no time overlapping between disk and network jobs. We further assume, the network media is OC-3 ATM (155 Mbits/sec) which could yield 128 Mbits/sec communication performance.

T can be derived from the sum of DJ=25.6 (128 KBytes/5 MBytes), all NJ 16* ((8192*8/128)*$10^{-3}$) milli seconds. T=25.6+8=33.6 milli seconds.

Therefore, Ri=8 KBytes/33.6=2 Mbits/sec, for all i.

Then, this VOD server could support up to 16 concurrent streams with 2 Mbits/sec playback rate.

Example Case 2

Assume, the VOD server has SCSI-2 storage with a transfer rate of 20 MBytes/sec and the data are striped across multiple disk drives.

Mi=256 KBytes, for all i

Ni=8 Kbytes, for all i

C=Mi/Ni=32,

If we assume the system platform could only perform sequential I/O. i.e. there is no time overlapping between disk and network jobs. We further assume, the network media is OC-3 ATM (155 Mbits/sec) which could yield 128 Mbits/sec communication performance.

Then, T could be derived from the sum of time for DJ=12.8 (256 KBytes/20 MBytes), all NJ=32* ((8192*8/128)*$10^{-3}$) milli seconds. T=12.8+16=28.8 milli seconds.

Therefore, Ri=8 KBytes/28.8=2.3/sec, for all i.

Then, this experimental VOD server could support up to 32 concurrent streams with 2.3/sec playback rate.

Example Case 3

Assume, the VOD server has SCSI-2 storage and the data are striped across multiple disk drives.

Mi=512 KBytes, for all i

Ni=8 Kbytes, for all i

C=Mi/Ni=64,

If we assume the system platform could only perform overlapping I/O. i.e. the DJ and NJs could be executed in the same time. We further assume, the network media is OC-3 ATM (155/sec) which could yield 128/sec communication performance.

Then, T could be derived from the maximum of time for DJ=25.6 (512 KBytes/20 MBytes), all NJ=64* ((8192*8/128)*$10^{-3}$) milli seconds. T=maximum(25.6, 32)=32 milli seconds.

Therefore, Ri=8 KBytes/32=2.1 Mbits/sec, for all i.

Then, this experimental VOD server could support up to 64 concurrent streams with 2.1 Mbits/sec playback rate.

From the above three examples in the above-described embodiment, the present invention provides a scalable solution for a VOD server which may use a variety of storage devices (single disk drive or disk array), network media, and for the type of data delivered (audio, video, and other real-time data).

Several considerations should be taken into account when implementing a real-time streaming server according to the advantageous aspects of the present invention.

Admission control: Admission control for any new "select movie" request need be qualified by several server considerations prior to granting such a request. The decision whether to accept the new request depends on the schedulability of the new request. If there is a free I/O phase in the service cycle to schedule the incoming disk job and the new request does not conflict with any other existing streams. Available networking resource and buffer memory should also be considered. If the VOD serer's resource cannot satisfy the incoming request, the VOD server will reject the request. Client should try to connect to VOD server later.

Figure 9:
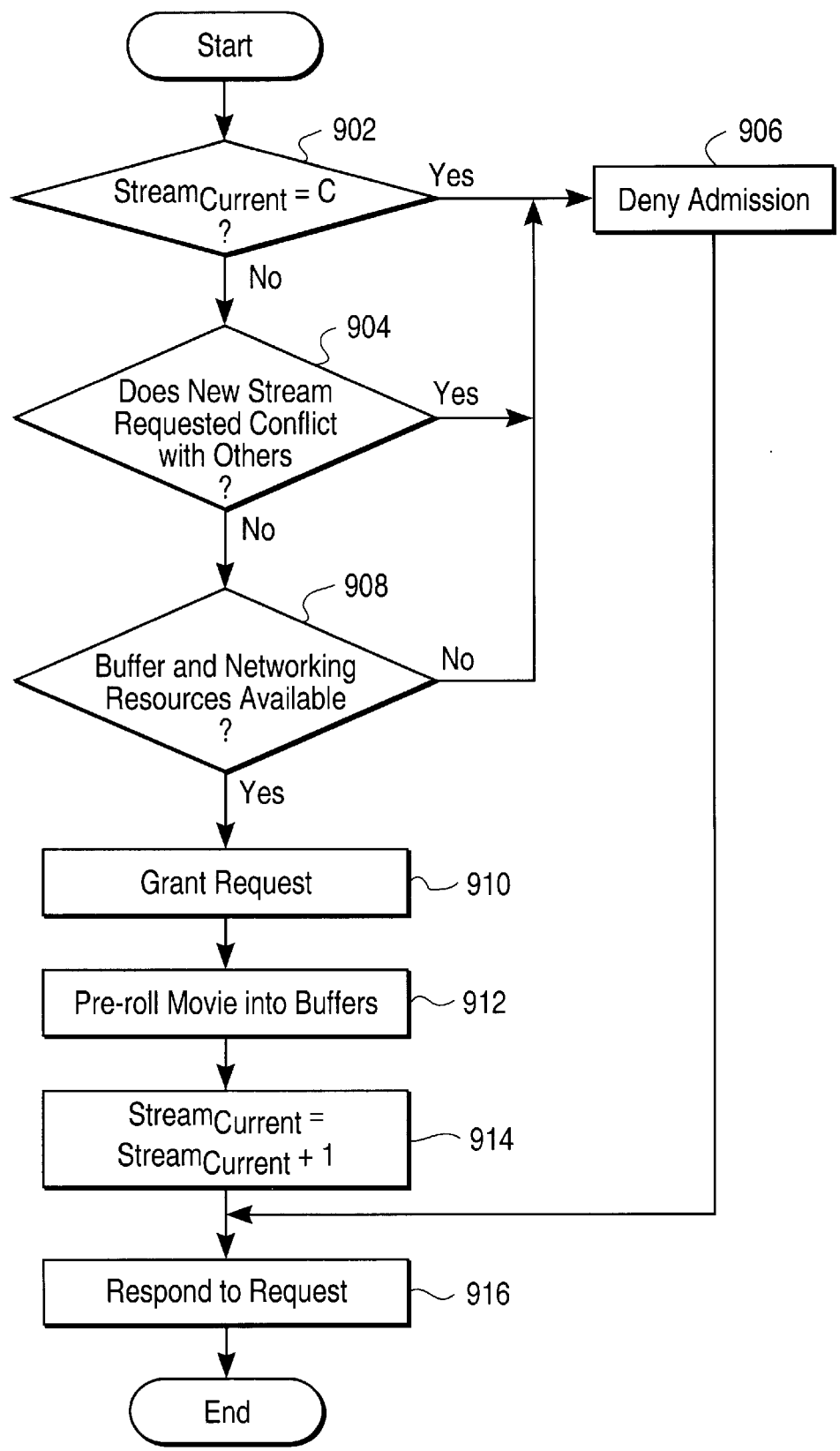
FIG. 9 shows a method for processing a new admission control job.

FIG. 9 shows one example of the processing of one control job, new admission of a stream to be served to a client. At step 902, it is determined whether the number of active streams, stream current is equal to C, the maximum number of streams for the server. If so, then a new stream can't be admitted, and the process ends. If not, then it can be determined whether the requested stream conflicts any other stream. For example, whether the requested stream is already being played to the requesting client. Other conflicts may further cause an abort of the new admission process. Lastly, it is determined at step 908 whether a buffer and networking resources are available. If all these conditions are met, then the stream can be admitted.

If the stream can be admitted then, at step 910, the request is granted. The stream (e.g. movie) to be played can be pre-rolled at step 912 to buffer necessary data for transmission. At step 914, the current stream counter is incremented. Then, at step 916 the server notifies the client that the stream has been granted admission, and the new admission control job has been performed.

Buffer requirements: The VOD server could implement double buffering, that is, reserve at least two buffers for each active streams. One is used to hold the temporary data retrieved from disk and the second one is to be used by the network jobs to send data back to clients. The VOD server could also reserve a shared buffer pools to be used by all the active streams. The availability of buffer will affect the decision made by the admission control.

Variation of stream playback rates: Advantageously, described embodiments of the present invention guarantees the maximum rate which could be played back by each stream. The real stream playback rate could be less than the maximum rate supported. In the third example above, the VOD server could support 64 2.1 Mbytes/sec stream. The real stream playback rate for stream i could be varied by the Mi and Ni. Assume Ni=7K bytes and Mi=7 Kbytes*64=448 Kbytes. Then Ri equals to 1.8 Mbytes/sec. Different playback rates could be provided among the different streams i in the same system by adjusting Mi and Ni for each stream. In alternative embodiments of the present invention, instead of Mi and Ni being equal for each of the streams, they could be varied to provide different playback rates. For example, audio streams may have different playback requirements than video streams, but be available from the same server.

Support of fast forward/backward: One implementation of the playback of one active stream with double speed could include allocating a free DJ slot for the stream. The stream could occupy this slot temporally to retrieve additional data block and send it out to remote client for as long as double speed playback is requested by the client. The scheduling algorithm supports this and does not have to be re-designed, nor will existing jobs be affected adversely. If there is no free DJ slot, the DJ can retrieve part of the data block to reflect the double speed playback. Partial retrieval of a data block is compression scheme dependent. For example, with some compression algorithms, such as MPEG, intra or predicted frames could not be transmitted, and thus, only inter or key frames would only be displayed.

Figure 10:
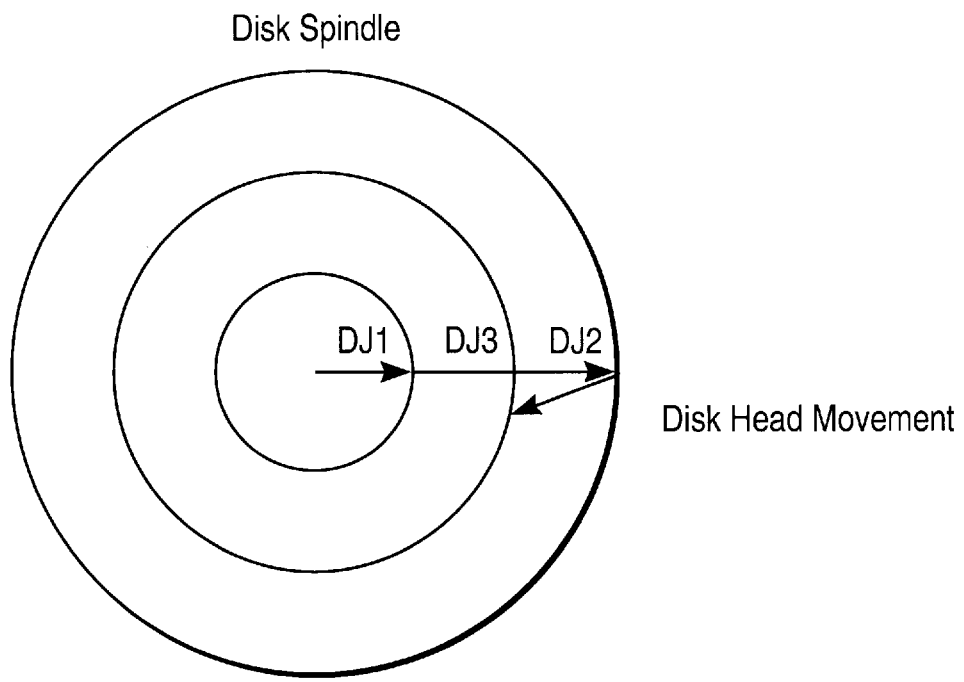
FIGS. 10 and 11 show how scheduling of stream jobs can be performed according to physical location of the streaming data on a physical medium
Figure 11:
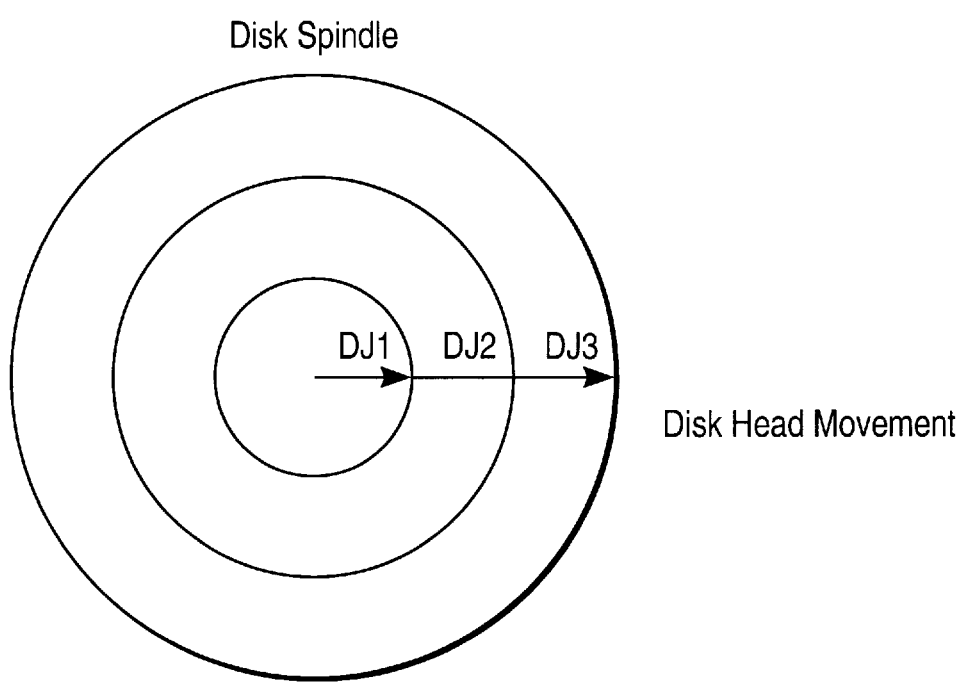

Sequence of the DJs: The sequence of DJ could be arranged in the order of FirstCome-First-Served (FCFS) or FIFO. However, it is preferred to be scheduled according to the physical location of the data. FIGS. 10 and 11 show an example of reducing disk seek time and improve the VOD server performance be schedule ordering of disk and network jobs according to physical location on the disk platters.

Such ordering should reduce latency and seek time which normally occur due to random distribution of streaming data on the physical media.

For example, in the case of FIG. 10, disk job ordering has not been performed according to the location on the platter. Thus, access latency occurs during the accessing of the different streams during the disk job processing phase of each I/O phase in the service cycle. DJ3 is physically located on the media between DJ1 and DJ2 introducing unnecessary head movement and rotational latency during access of each stream. As shown in FIG. 11, in alternative embodiments of the present invention, disk jobs are scheduled in order of their relative location to one another on the physical storage medium. The ordering DJ1, DJ2 and DJ3 in the service cycle obviates any unnecessary rotational or head movement of the medium and any corresponding access latency. In the admission method above, a testing of the physical placement of the stream and the re-ordering of disk jobs in the service cycle may need to be performed in order to take advantage of this additional criteria for disk job scheduling.

The present invention has a number of advantages which distinguish it from the prior art real-time streaming schemes. The described real-time server I/O streaming scheme is scalable in terms of storage (single disk drive or disk arrays, network media (ATM, switched Ethernet, and FDDI), data delivered (video, audio, and real-time data), and operating system platform (MacOS, PC, and Unix). Admission control may based on the availability of the following factors: free disk job slots, free buffer memory, and free networking bandwidth. The scheduler could be implemented within the system internal or a stand-alone application which resides on top of the platform. The server is not architecture dependent, and can be implemented in a thread-based operating system, such as the MacOS operating system available from Apple Computer.

The server also efficiently uses disk resources, and provides a constant delivery rate. A large block of data is retrieved to a buffer and is sends out a piece of requested data in constant rate. Therefore, it fully exploits the efficiencies of large block retrieval for storage. Lastly, because the streaming data are sent at a constant rate with a smaller portions at a time, dramatically reducing network congestion. Network performance is thus improved significantly.

Thus, by use of the foregoing, real time streaming data can be provided on a number of different network media, and with different clients and servers with a variety of hardware configurations. This improved salability among different capacity and number of media and systems allows maximum performance within a given configuration with a minimum of impact on system and communication resources. It will be appreciated that though the foregoing has been described especially with reference to FIGS. 1–11, that many modifications made be made, by one skilled in the art, without departing from the scope of the invention as described here. The invention is thus to be viewed as limited only by the appended claims which follow.

What is claimed is:

1. An automatic method for process scheduling of streaming data in a computer system comprising the following steps:
   a. dividing a service cycle into a first plurality of input/output (I/O) phases for a second plurality of streams of real-time data, wherein said second plurality has a maximum value equal to said first plurality;
   b. for each of said first plurality of I/O phases, scheduling one of a second plurality of disk jobs, if any, for retrieving a portion of one of said second plurality of streams of real-time data from a storage medium; and
   c. scheduling a first plurality of network jobs for each of said second plurality of disk jobs, each of said first plurality of network jobs scheduled to be processed in each of said I/O phases, and for processing and transmitting a portion of data contained in each of said second plurality of disk jobs, so that all of the data containing each of said second plurality of disk jobs is scheduled to be completely transmitted within said service cycle.

2. The method of claim 1 wherein each said I/O phase further includes a control job, if any, for negotiating a control request from a client for a stream of said real-time data.

3. The method of claim 1 wherein each said disk job i has a length $M_i$ and each said network job has a length $N_i$.

4. The method of claim 3 wherein said first plurality is equal to $M_i/N_i$.

5. The method of claim 1 wherein said disk job, if any, is scheduled for a current I/O phase if no disk job has been scheduled for all of said streams of real-time data for said current service cycle.

6. The method of claim 1 wherein each of said second plurality of network jobs obtain data from a disk job from one of said first plurality of I/O phases.

7. The method of claim 1 wherein said disk job and said second plurality of network jobs are executed concurrently.

8. The method of claim 1 wherein said computer system comprises a server, and said scheduling of said disk job, if any, and said second plurality of network jobs is responsive to a client request for each of said second plurality of streams of real-time data.

9. The method of claim 1 wherein said scheduling of said disk job for each of said first plurality of I/O phases is qualified by a physical location of each of said second plurality of streams of real-time data.

10. An apparatus for scheduling the processing of streaming data in a computer system comprising;
   a. a means for dividing a service cycle into a first plurality of input/output (I/O) phases for a second plurality of streams of real-time data, wherein said second plurality has a maximum value equal to said first plurality;
   b. a means for scheduling one of a second plurality of disk jobs, if any, for each of said first plurally of I/O phases and for retrieving a portion of one of said second plurality of streams of real-time data from a storage medium; and
   c. a means for scheduling in a first plurality of network jobs for each of said second plurality of disk jobs, each of said plurality of network jobs scheduled to be processed in each of said I/O phases, and for processing and transmitting a portion of data contained in each of said second plurality of disk jobs, so that all of the data containing of said second plurality of disk jobs is scheduled to be completely transmitted within said service cycle.

11. The apparatus of claim 10 wherein each said I/O phase further includes a control job, if any, for negotiating a control request from a client for a stream of said real-time data.

12. The apparatus of claim 10 wherein each said disk job i has a length $M_i$ and each said network job has a length $N_i$.

13. The apparatus of claim 12 wherein said first plurality is equal to $M_i/N_i$.

14. The apparatus of claim 10 wherein said disk job, if any, is scheduled for a current I/O phase if no disk job has been scheduled for all of said streams of real-time data for said current service cycle.

15. The apparatus of claim 10 wherein each of said second plurality of network jobs obtain data from a disk job from one of said first plurality of I/O phases.

16. The apparatus of claim 10 wherein said disk job and said second plurality of network jobs are executed concurrently.

17. The apparatus of claim 10 wherein said computer system comprises a server which schedules said disk job, if any, and said second plurality of network jobs responsive to a first client request for each of said plurality of streams of real-time data.

18. The apparatus of claim 10 wherein said scheduling of said disk job for each of said first plurality of I/O phases is qualified by a physical location of each of said second plurality of streams of real-time data.

19. A computer system medium encoded with instructions configured to cause a computer system to perform the steps of the following method for scheduling the processing of streaming data:
   a. dividing a service cycle into a first plurality of input/output (I/O) phases for a second plurality of streams of real-time data, wherein said second plurality has a maximum value equal to said first plurality;
   b. for each of said first plurality of I/O phases, scheduling one of a second plurality of disk jobs, if any, for retrieving a portion of one of said second plurality of streams of real-time data from a storage medium; and
   c. scheduling a first plurality of network jobs for each of said second plurality of disk jobs, each of said first plurality of network jobs scheduled to be processed in each of said I/O phases, and for processing and transmitting a portion of data contained in each of said second plurality of disk jobs, so that all of the data containing each of said second plurality of disk jobs is scheduled to be completely transmitted within said service cycle.

20. The computer system medium of claim 19 wherein each said I/O phase further includes a control job, if any, for negotiating a control request from a client for a stream of said real-time data.

21. The computer system medium of claim 19 wherein each said disk job i has a length $M_i$ and each said network job has a length $N_i$.

22. The computer system medium of claim 21 wherein said first plurality is equal to $M_i/N_i$.

23. The computer system medium of claim 19 wherein said disk job, if any, is scheduled for a current I/O phase if no disk job has been scheduled for all of said streams of real-time data for said current service cycle.

24. The computer system medium of claim 19 wherein each of said second plurality of network jobs obtain data from a disk job from one of said first plurality of I/O phases.

25. The computer system medium of claim 19 wherein said disk job and said second plurality of network jobs are executed concurrently.

26. The computer system medium of claim 19 wherein said computer system comprises a server, and said scheduling of said disk job, if any, and said second plurality of network jobs is responsive to a client request for each of said second plurality of streams of real-time data.

27. The computer system medium of claim 19 wherein said scheduling of said disk job for each of said first plurality of I/O phases is qualified by a physical location of each of said second plurality of streams of real-time data.

* * * * *

UNITED STATES PATENT AND TRADEMARK OFFICE
CERTIFICATE OF CORRECTION

PATENT NO : 6,032,200

DATED : Feb. 29, 2000

INVENTOR(S) : Lin

It is certified that error appears in the above-identified patent and that said Letters Patent are hereby corrected as shown below:

In the Claims:

Claim 10, Column 10, Line 43, please delete "plurally" and insert - -plurality- - in it's place.

Claim 10, Column 10, Line 47, please delete "in".

Claim 10, Column 10, Line 49, please insert the word - -first- - after the word said.

Claim 10, Column 10, Line 53, please insert the word - -each- - after the word containing.

Signed and Sealed this

Eighth Day of May, 2001

*Attest:*

NICHOLAS P. GODICI

*Attesting Officer*  *Acting Director of the United States Patent and Trademark Office*